J. PRESCOTT.
Cotton Gin.

No. 18,410.

Patented Oct. 13, 1857.

UNITED STATES PATENT OFFICE.

JEDEDIAH PRESCOTT, OF ROCKFORD, ILLINOIS.

IMPROVEMENT IN COTTON-GIN FEEDERS.

Specification forming part of Letters Patent No. 18,410, dated October 13, 1857.

*To all whom it may concern:*

Be it known that I, JEDEDIAH PRESCOTT, of Rockford, in the county of Winnebago and State of Illinois, have invented a new and Improved Automatic Feeding Device for Cotton-Gins; and I do hereby declare that the following is a full, clear, and exact description of the same, reference being had to the annexed drawings, making a part of this specification, in which—

Figure 1:
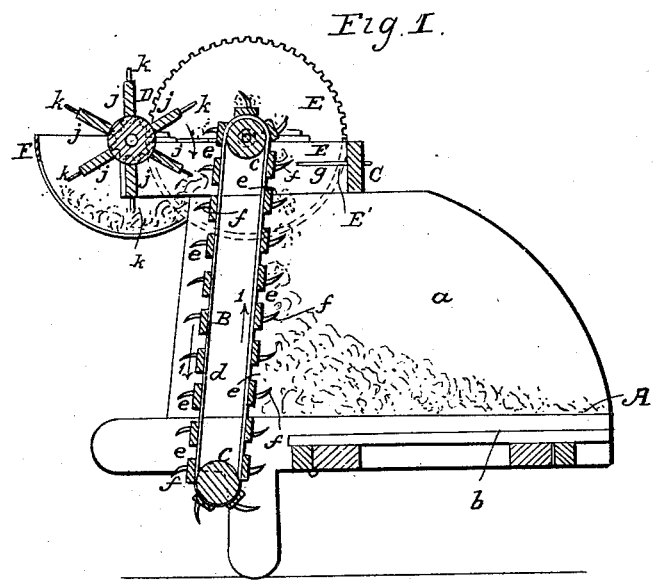
Figure 2:
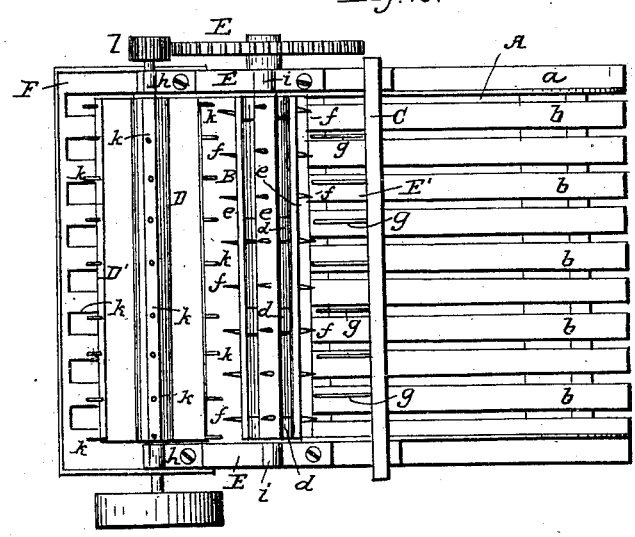

Figure 1 is a vertical central section of my improvement. Fig. 2 is a plan or top view of the same.

Similar letters of reference indicate corresponding parts in the two figures.

The object of this invention is to supersede the manual feeding of cotton to gins, thereby dispensing with an attendant for that purpose, insuring a more regular feed than can be given the cotton by hand, and also serving during its operation to deprive the cotton of dust and dirt before entering the gin-hopper.

My invention consists in the employment or use of an endless toothed apron placed within a suitable box and used in connection with a rotary fan-stripper and stationary teeth or comb arranged, as hereinafter shown, to accomplish the desired result.

To enable those skilled in the art to fully understand and construct my invention, I will proceed to describe it.

A represents a box or hopper formed of two parallel sides, $a\ a$, and having a bottom formed of slats $b$, with suitable spaces between them to allow dust, dirt, and foreign substances to pass through.

B is an endless toothed apron which passes around rollers $c\ c$, one being at the top and the other at the bottom of the box or hopper, and at its front end, the apron B forming the front side of the box or hopper. This apron is formed of a series of belts, $d$, which pass around the rollers $c\ c$, and have slats $e$ attached transversely to them at certain distances apart. The slats $e$ are provided with teeth $f$, which may be of curved or any proper form, the teeth extending the whole length of the slats and placed at a suitable distance apart.

C is a traverse-bar placed on the upper part of the box or hopper A, and parallel with the upper roller $c$ of the toothed apron B. This bar is stationary, and is provided with teeth $g$, the points of which extend toward and within a suitable distance of the apron B, forming what may be termed a "comb," which I will designate by E'.

D is a shaft, the journals of which are fitted in bearings $h$, attached to bars E E, to which are also attached the bearings $i$ of the upper roller $c$ of the apron B. The shaft D has radial flanges or wings $j$ attached to it, which extend the whole length of the shaft and have teeth $k$ driven in their ends, the ends of said teeth, as the shaft D rotates, passing between the teeth $f$ of the apron B. The flanges $j$ serve as a fan, and the teeth $k$ serve the office of a picker, the whole being designated by D'. The shaft D has a pinion, $l$, placed on one end of it, said pinion gearing into a toothed wheel, E', which is placed at one end of the shaft of the upper roller $c$ of the toothed apron B.

The operation is as follows: The cotton as it is taken from the field is thrown into the box or hopper A, and motion is given the shaft D by means of a belt from the driving or other shaft on the gin, the device being placed directly in front of the gin, so that the shaft D, with its wings, will project over and into the hopper F of the gin. The apron B moves in the direction indicated by arrow 1, and the shaft D rotates in the direction indicated by arrow 2. The cotton is carried up from the box A by the teeth $f$ of the apron B, and is stripped therefrom by the teeth $k$ of the wings $j$, the wings creating a blast and freeing the cotton from dust as the teeth $k$ detach it from the teeth $f$ of the apron B. The teeth $k$ rotate within the hopper F, and the cotton is taken from said hopper by the saws, which project between ribs arranged as usual. The teeth $g$ serve to distribute the cotton upon the apron in an even manner, and prevent it passing in large masses over the top roller $c$. Said teeth also, in connection with the moving teeth of the apron, serve to tighten up the cotton, detaching its fibers, so that it will be presented in a loose and proper state to the action of the saws.

Having thus described my invention, what I claim as new, and desire to secure by Letters Patent, is—

The endless toothed apron B, placed in the hopper or box A, in combination with the stripper and fan D' and stationary teeth or or comb E', arranged substantially as and for the purpose set forth.

JEDEDIAH PRESCOTT.

Witnesses:
 EPHRAIM G. RICKER,
 JAMES G. MANLOVE.